United States Patent [19]

Keller

[11] Patent Number: 4,603,672

[45] Date of Patent: Aug. 5, 1986

[54] FUEL VAPORIZER FOR INTERNAL COMBUSTION ENGINE

[76] Inventor: R. W. Keller, 716 Moore La., Dewey, Okla. 74029

[21] Appl. No.: 690,098

[22] Filed: Jan. 9, 1985

Related U.S. Application Data

[63] Continuation-in-part of Ser. No. 496,600, May 20, 1983.

[51] Int. Cl.$^4$ ............................................. F02M 31/00
[52] U.S. Cl. ..................................... 123/545; 123/540; 123/554; 261/144
[58] Field of Search ............... 123/545, 590, 591, 553, 123/554, 555, 540, 541, 557, 556; 165/51, 52; 48/189.2, 180.1; 261/144, 145

[56] References Cited

U.S. PATENT DOCUMENTS

| | | | |
|---|---|---|---|
| 1,314,386 | 8/1919 | Butler | 165/52 |
| 1,783,781 | 12/1930 | Falk | 123/545 |
| 1,974,586 | 10/1934 | Prentiss | 122/122 |
| 2,120,779 | 6/1938 | Ericson | 123/170 |
| 2,240,311 | 4/1941 | Mills | 257/74 |
| 2,319,752 | 5/1943 | Smith | 123/545 |
| 2,833,262 | 5/1958 | August | 123/545 |
| 2,857,898 | 10/1950 | Cohn | 123/590 |
| 2,864,355 | 12/1958 | Woodworth | 123/545 |
| 3,762,385 | 10/1973 | Hollnagel | 123/122 A |
| 3,961,616 | 6/1976 | Brown | 123/545 |
| 4,008,692 | 2/1977 | Shinohara et al. | 123/3 |
| 4,059,080 | 11/1977 | Rudert | 123/541 |
| 4,072,138 | 2/1978 | Hawkins | 123/540 |
| 4,108,126 | 8/1978 | Sanada et al. | 123/122 E |
| 4,256,066 | 3/1981 | Serruys | 123/545 |
| 4,270,506 | 6/1981 | Lowe | 123/523 |
| 4,286,564 | 9/1981 | Van Tuyl | 123/545 |
| 4,294,219 | 10/1981 | Rowe | 123/557 |
| 4,301,781 | 11/1981 | Lindberg | 123/541 |
| 4,319,554 | 3/1982 | Buffie | 123/559 |

FOREIGN PATENT DOCUMENTS

| | | | |
|---|---|---|---|
| 658433 | 2/1963 | Canada | 123/545 |
| 1110524 | 2/1956 | France | 123/545 |
| 1377743 | 12/1974 | United Kingdom | 123/545 |

Primary Examiner—Ronald H. Lazarus
Attorney, Agent, or Firm—Glaser, Griggs & Schwartz

[57] ABSTRACT

Pre-cooled aerosol spray fuel/air mixture is discharged through an array of metering tubes which are housed within a heat exchange chamber. Engine coolant is circulated through the heat exchange chamber. As the aerosol fuel/air mixture is drawn from the carburetor through the metering tubes and into the manifold, heat transfer from engine coolant circulating through the heat exchange chamber causes the aerosol mixture in the metering tubes to vaporize. In a preferred embodiment, the temperature rise within the heat exchange chamber is limited by heat transfer to an air circulation tube which is coiled within the heat exchange chamber.

3 Claims, 9 Drawing Figures

FUEL VAPORIZER FOR INTERNAL COMBUSTION ENGINE

CROSS-REFERENCE TO RELATED APPLICATION

This application is a continuation-in-part of Ser. No. 496,600, filed May 20, 1983.

BACKGROUND OF THE INVENTION

1. Field of the Invention

The present invention relates generally to internal combustion engines and in particular to apparatus for vaporizing fuel/air aerosol mixtures produced by carburetors.

2. Description of the Prior Art

In an internal combustion engine, the function of the carburetor is to produce a combustible fuel-and-air mixture. The combustible mixture may comprise an aerosol mixture of tiny droplets of fuel entrained in a stream of air, or it may be a homogeneous mixture of vaporized fuel and air. In carburetors which produce an aerosol mixture, fuel is aspirated in a stream of combustion air with the assistance of a venturi. As a result of heat absorption on the way to the cylinder, these droplets are vaporized, so that the mixture thus becomes a flammable gas. The efficiency of the engine is directly related to the amount of energy released by combustion of a given volume of fuel/air mixture within the cylinder. The primary purpose of the conventional carburetor is to mix the fuel droplets uniformly with intake air in the proper proportions to produce a uniform aerosol mixture with the goal of obtaining complete combustion.

In the operation of conventional carburetors, liquid fuel is aspirated from a choke tube by the suction developed within a venturi region of the carburetor air passage. The aspiration of the fuel within this relatively low pressure region causes the fuel to be finely divided into tiny droplets that are carried along in a moving air mass to the cylinder. The size of each fuel droplet produced for a given pressure and air flow rate is dependent upon the viscosity of the fuel, and the viscosity of the fuel is dependent upon its temperature. It will be appreciated that at relatively low temperatures, the fuel droplets will be larger and will be less uniformly distributed throughout the moving air mixture, thereby leading to incomplete combustion when introduced into the cylinder. Conversely, it will also be appreciated that as the temperature of the fuel is increased, the fuel droplets constantly diminish in size until fuel vapor is produced. The reason for this is that the surface tension of the fuel droplets increases as fuel temperature decreases.

It is well known that a liquid fuel may be heated and converted to a vapor for mixture with air to establish a combustible fuel/air mixture for delivery to the combustion chamber of an internal combustion engine. By vaporizing the liquid fuel, the mixing takes place prior to entering the intake manifold, affording rapid, efficient ignition in the combustion chamber. However, for high flow rates of combustion air, it is difficult to maintain the appropriate fuel/air ratio over the wide operating range from idle through cruise and high speed operation. The most common problem involved in such arrangements is that the fuel/air ratio is too lean, resulting in higher than normal engine operating temperatures. Widespread use of such fuel preheater arrangements has been limited by the fuel vapor volume requirements for carburetors having relatively high flow rates of combustion air, and the inability to mix the preheated fuel vapor with the incoming air in the correct proportions to satisfy a wide range of engine operating conditions.

In the conventional carburetor, liquid fuel is mixed with incoming air and flows to the combustion chamber as a wet aerosol mist through the intake manifold. A large percentage of fuel droplets coat the intake manifold or combustion chamber walls and are blown into the exhaust manifold due to intake-exhaust overlap. The combustion reaction takes place when a molecule of oxygen links with a similar molecule of fuel by coupling of the outer rings. This coupling can only be accomplished when the fuel and oxidizer have been vaporized to a dry gas. A liquid fuel droplet can only vaporize on the interfacing surface with the oxidizer. Energy released is greatly restricted, and because of the high temperatures associated combustion, the liquid fuel which does not burn forms nitrousoxides and hydrocarbon waste products which gives rise to air pollution. Preferably, the fuel/air mixture is completely vaporized inside the intake manifold, thereby permitting instantaneous, efficient ignition in the combustion chamber.

Accordingly, there is a continuing interest in providing a carburetor and fuel preheater combination having the ability to produce an adequate volume of fuel vapor and having the ability to mix the fuel vapor with incoming air in the correct proportions to satisfy a wide range of engine operating conditions, and also to preheat the fuel/air mixture to provide efficient ignition and combustion within the engine cylinders.

Because more complete combustion and substantially more energy can be derived from a given volume of fuel/air aerosol mixture in which the droplets of fuel are very finely divided and uniformly dispersed, as opposed to the same volume of air mixed with superheated fuel vapor, it is desirable to maintain the temperature of the fuel substantially below its boiling point during the time that the fuel/air aerosol mixture is produced.

SUMMARY OF THE INVENTION

Fuel from a fuel pump is circulated through cooling coils which are connected in series between a fuel pump and carburetor of an internal combustion engine. The cooling coils are forwardly mounted of a radiator where they are exposed to ambient air flow. As ambient air flows over the cooling coils, heat is transferred from fuel in the cooling coils, thereby lowering the fuel temperature. The pre-cooled fuel is pumped into the carburetor where it is mixed with air to form an aerosol fuel-/air spray mixture. The pre-cooled aerosol fuel/air spray mixture is discharged through an array of elongated metering tubes which are housed within a heat exchange chamber. Engine coolant is circulated through the heat exchange chamber. As the aerosol fuel/air mixture is drawn from the carburetor through the jets and into the manifold, heat from the engine coolant causes the aerosol mixture to vaporize.

Circulation of the fuel through the heat exchange coils ensures that the fuel will be below ambient temperature as it enters the carburetor. Any heat transferred to the fuel in the fuel line due to heat being radiated by the engine, and or from heat throw-off by the radiator, will be transferred to the oncoming air flow which is pulled across the radiator. Thus, the temperature of the fuel as it enters the carburetor should be below the ambient temperature of the engine compartment. This will ensure that the surface tension of the fuel as it enters the carburetor is relatively high, so that a rich aerosol mixture can be produced, even at very high flow rates of combustion air.

By drawing the aerosol mixture through the elongated metering tubes, the aerosol mixture is divided into a number of flow streams which corresponds with the number of jets or metering tubes. Since the metering tubes are in intimate contact with the engine coolant, each one of the metering tubes is at substantially the same temperature as the engine coolant fluid which is circulated through the heat transfer chamber. Thus, each one of the separate fuel/air flow streams is heated to substantially the same temperature. According to this arrangement, all of the fuel/air aerosol mixture is preheated to the same or substantially the same temperature as it enters the intake manifold. Because the heat transfer jets are relatively short, and because they are in line with the axial flow path of the fuel/air aerosol mixture, the residence time in the vaporizer stage is limited and there is no opportunity for condensation to occur which might cause slugging of fuel condensate into the intake manifold.

The mass flow rate of fuel through a carburetor may vary substantially according to operating conditions such as starting, idling, accelerating and cruising. To improve efficiency and promote complete combustion, the temperature of the fuel/air mixture produced by the heat exchanger should remain within a predetermined temperature range below the boiling point temperature of the fuel, but substantially above ambient temperature, in a preferred range of about 110° F. to 140° F. The operating temperature of the engine coolant is typically in the range of 180° F. to 200° F. Thus, it is desirable to limit the temperature rise of the engine coolant within the heat exchanger to maintain the temperature of the metering tubes in a range of 110° F. to 140° F. In a preferred embodiment, the temperature rise within the heat exchanger chamber is limited by the flow of the ambient air through an air circulation tube which is coiled within the chamber. The air circulation tube maintains the temperature of the metering tubes within the preferred range, and prevents a superheat condition in the fuel vaporizer assembly.

BRIEF DESCRIPTION OF THE DRAWINGS

The foregoing and related objects and advantages of the present invention will become apparent from the following specification, claims and appended drawings wherein:

DETAILED DESCRIPTION OF THE PREFERRED EMBODIMENT

Figure 1:
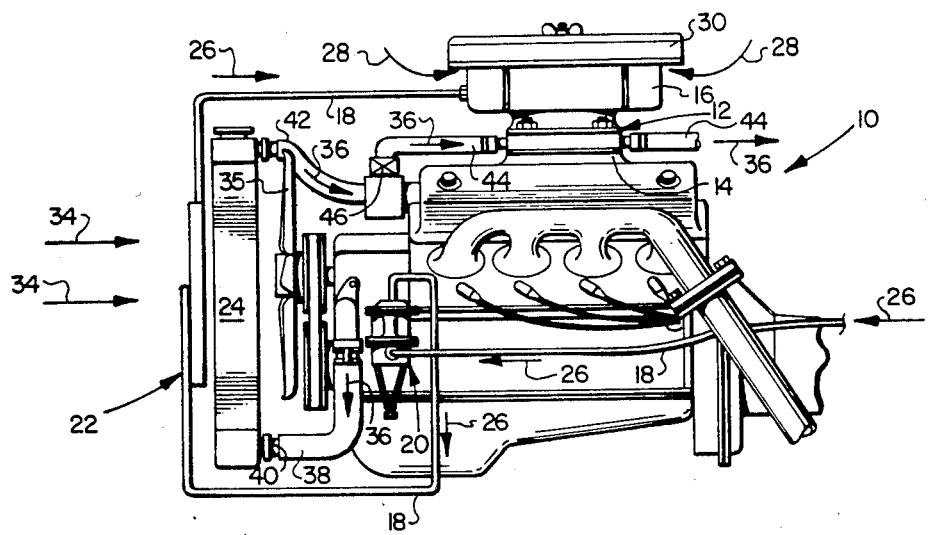
FIG. 1 is a side elevation view of an internal combustion engine having a fuel preheater stage constructed according to the teachings of the present invention.

In the description which follows, like parts are marked throughout the specification and drawings with the same reference numerals, respectively. The drawings are not necessarily to scale and in some instances, proportions have been exaggerated in order to more clearly depict certain features of the invention.

Referring now to FIG. 1 of the drawings, an internal combustion engine 10 is equipped with a fuel vaporizer assembly 12. The fuel vaporizer assembly 12 is mounted between the intake manifold 14 and carburetor 16. According to this arrangement, the fuel vaporizer assembly 12 transfers heat from the engine coolant to the fuel/air aerosol mixture which is produced by the carburetor, whereby the fuel/air mixture is uniformly heated and vaporized as it enters the intake manifold 14.

Figure 2:
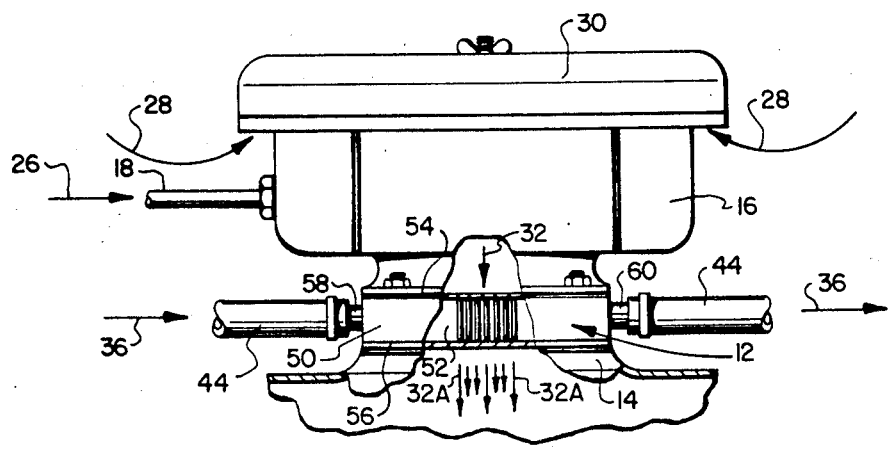
FIG. 2 is an elevation view, partly in section, of the fuel preheater stage shwon in FIG. 1.

Fuel is pumped from an external fuel tank (not illustrated) through a fuel delivery line 18 by a fuel pump 20. According to one aspect of the invention, the fuel is circulated through a heat transfer coil assembly 22 which is connected in series fluid circuit relation between the fuel pump 20 and the carburetor 16. Additionally, the heat transfer coil assembly 22 is mounted forwardly of the engine, and preferably forwardly of the radiator 24 as illustrated in FIG. 1. In this position, the cooling coil assembly 22 is forwardly mounted of a radiator where the coil sections are exposed to ambient air flow. As ambient air flows over the cooling coils, heat is transferred from the fuel 26, thereby lowering the fuel temperature. The pre-cooled fuel 26 is pumped into the carburetor 16 where it is mixed with air 28 which is drawn in through an air filter assembly 30 to form an aerosol spray fuel/air mixture 32 (FIG. 2).

In the foregoing arrangement, ambient air as represented by the arrows 34 is pulled across the heat transfer coil assembly 22 and also across the radiator 24 by the cooling fan 35. A voume of heat transfer fluid such as engine coolant 36 is circulated out of the water jacket circulation system of the engine block through a radiator hose 38 into a radiator inlet connection 40. As the engine coolant 36 is circulated through the radiator 24, heat is transferred to the cooling air 34 which is drawn across the radiator fins by the fin 34. The engine coolant 36 is circulated back into the engine block through a radiator hose 42. The temperature of the coolant 42 is regulated by a thermostat valve (not illustrated) to maintain temperature of the engine coolant at a safe operating level in the range of 160° F. to 180° F.

According to one feature of the invention, engine coolant 36 is diverted into the fuel vaporizer assembly 12 through a by-pass hose 44. The thermostat valve 46 is designed to close when its operating temperature exceeds a predetermined level, for example 200° F. According to this arrangement, the engine coolant 36 is by-passed through the radiator hose 44 into the fuel vaporizer assembly 12 at all times except when the engine coolant rises above a safe operating level. The purpose of this arrangement is to avoid creating a superheat condition in the fuel vaporizer assembly 12.

Figure 3:
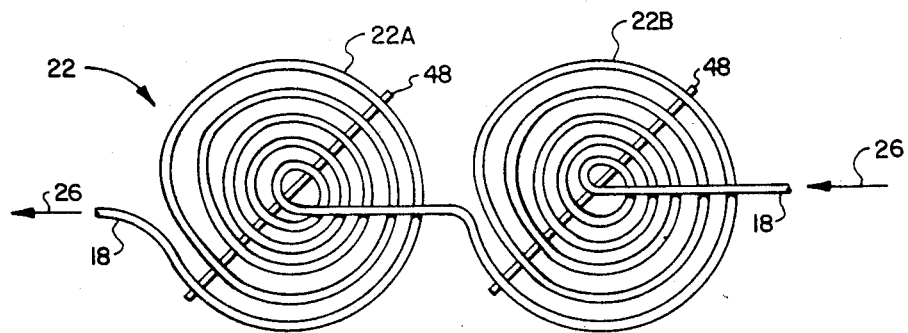
FIG. 3 is an elevation view of a heat transfer coil assembly.

Referring now to FIG. 3, the heat transfer cooling coil assembly 22 comprises a first cooling section 22A and a second cooling section 22B. The cooling coils sections 22A, 22B are connected in series fluid circuit relation. Each cooling coil is wound in a flat spiral and is mounted onto an offset bar 48. Each offset bar 48 is bolted onto the frame or chasis of the vehicle so that the offset orientation of the cooling coil assembly 22 is maintained as illustrated in FIG. 1.

Figure 4:
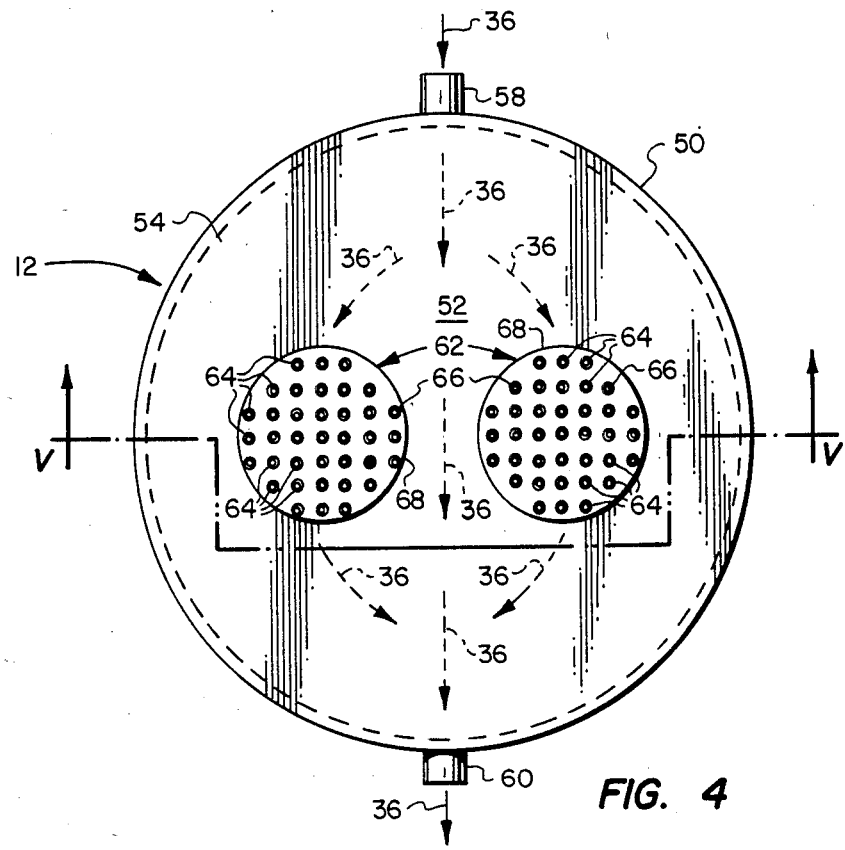
FIG. 4 is a top plan view of the fuel preheater stage shown in FIG. 2.

Referring now to FIGS. 2 and 4, the fuel vaporizer assembly 12 comprises a cylindrical sidewall 50 which encloses a heat transfer chamber 52. The heat transfer chamber 52 is sealed by top and bottom circular panel members 54, 56. An inlet fitting 58 and outlet fitting 60 are formed at diametrically opposite positions in the cylindrical sidewall 50. One segment of the by-pass hose 44 is connected from the thermostat valve 46 to the inlet fitting 58, and another segment of the by-pass hose 44 is connected from the outlet fitting 60 for returning the engine coolant 36 to the engine water jacket circulation system.

Figure 5:
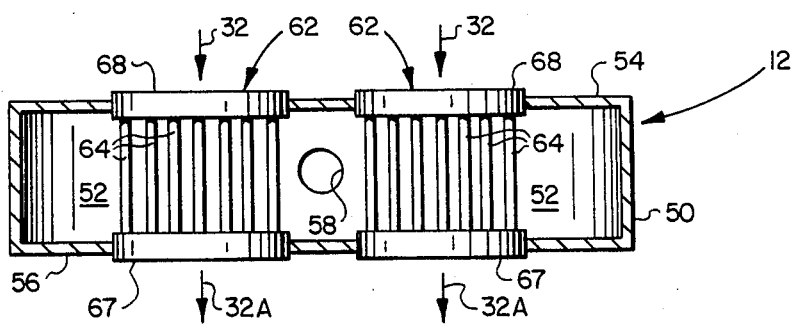
FIG. 5 is a sectional view, taken along the line V—V of FIG. 4, of the fuel preheater assembly.

According to an important feature of the invention, the pre-cooled aerosol spray fuel/air mixture 32 is discharged from the carburetor 16 through an array 62 of "bottleneck" jet metering tubes 64 which are housed within the heat exchange chamber 52. Referring to FIGS. 4 and 5, two metering tube arrays 62 are illustrated. It should be understood that one or more arrays of metering tubes can be used to good advantage, depending upon the number of barrels in the carburetor. As can be seen in FIGS. 4 and 5, two arrays 62 are mounted side-by-side within the heat transfer chamber 52, with the engine coolant which is circulated through the heat transfer chamber 52 passing in intimate contact with each "bottleneck" jet metering tube 64 of the array.

Figure 6A:
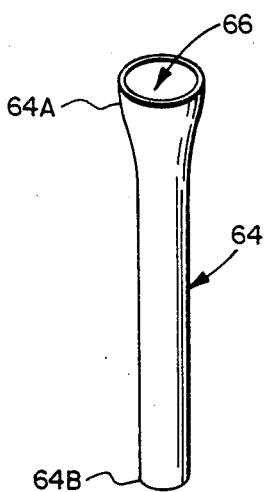
FIG. 6A is a perspective view of a metering tube.
Figure 6B:
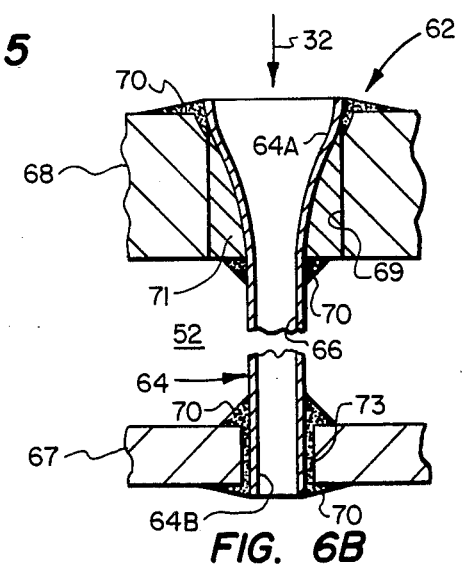
FIG. 6B is a sectional view of a metering tube assembled onto upper and lower end plates.

Referring now to FIGS. 6A and 6B, each metering tube 64 has a jet passage formed by a fine diameterr bore 66. In this embodiment, the inside diameter of each bore 66 is approximately 7/64" and the length of each tube 64 is approximately two inches (2"). The metering tubes 64 are arranged in a circular pattern which is generally coincident with the discharge opening of the carburetor barrel with which it is associated. The lip of each metering tube is sealed at its bottom and top to end plates 67, 68, respectively. Preferably, the metering tubes 64 are formed of copper or stainless steel and the union of each metering tube with each end plate is sealed by solder 70, as can best be seen in FIG. 6B.

Referring now to FIGS. 5, 6A and 6B, each "bottleneck" jet metering tube 64 has a flared inlet lip portion 64A and a cylindrical discharge lip portion 64B. The upper plate 68 is provided with a bore 69 in which the upper end of the metering tube 64 is received. The flared inlet lip portion 64A is sealed against the bore 69 by a solder deposit 70. Additionally, the transitioning portion of the flared lip portion 64A is sealed against the bore 69 by a solder fillet 71. A cylindrical bore 73 is formed in the lower mounting plate 67. The cylindrical discharge portion 64B is sealed against the bore 73 by a deposit of solder 70 which is sweated into the annulus between the cylindrical sidewall 64B and the bore 73. The metering tube 64 is referred to as a "bottleneck" jet metering tube because of the presence of the flared inlet lip portion 64A and the fine diameter metering bore 66.

Figure 7:
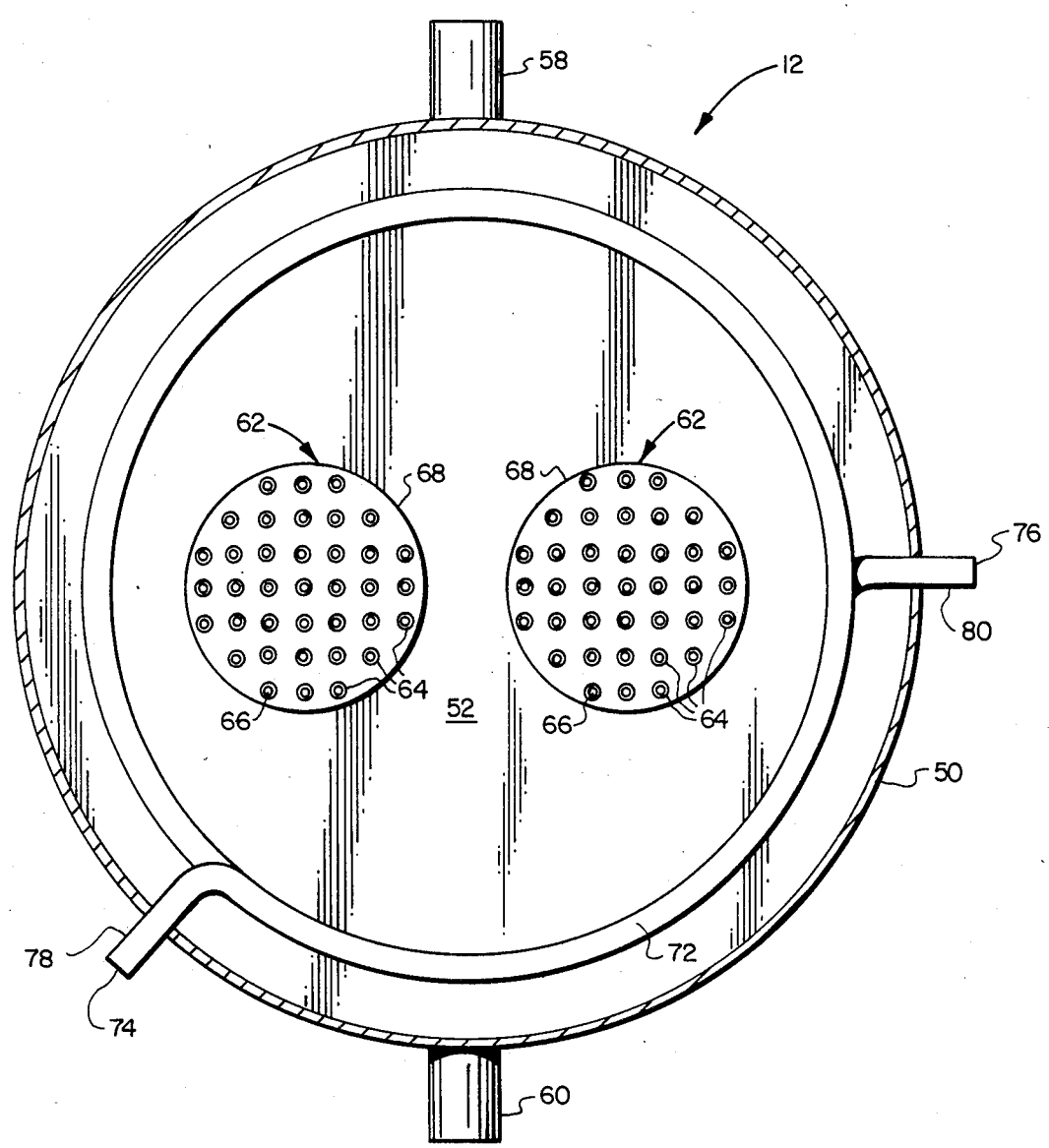
FIG. 7 is a view similar to FIG. 4 which illustrates the combination of an air circulation tube with the fuel preheater.
Figure 8:
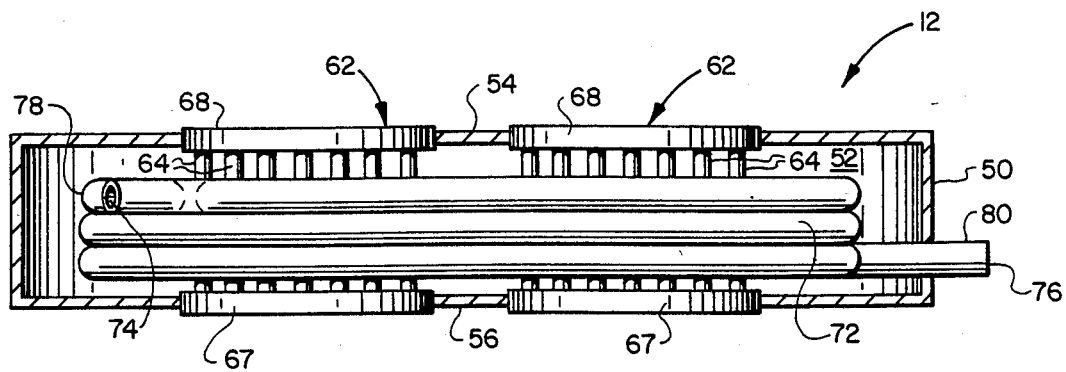
FIG. 8 is an elevation view, partly in section, of the fuel preheater shown in FIG. 7.

Referring now to FIGS. 7 and 8, an air circulation tube 72 is coiled within the heat transfer chamber 52. The air circulation tube 72 is approximately 6 feet in length with an inside diameter of ⅜". The air circulation tube 72 is disposed closely adjacent the cylindrical sidewall 50 and completely encircles the metering tube groups 62. According to this arrangement, the coils of the air circulation tube 72 are in intimate contact with the water circulated through the heat transfer chamber 52. Ambient air enters the air circulation tube 72 through an inlet port 74 and is discharged through an outlet port 76. The air circulation tube 72 includes a neck portion 78 and a neck portion 80 which project through the cylindrical sidewall 50 of the fuel vaporizer assembly 12. The surrounding sidewall portions are sealed against the tubular neck portions 78, 80 to prevent leakage of the engine coolant.

As can best be seen in FIG. 7, the inlet port 74 is oriented generally in the direction of ambient air flow which is forced across the engine block by the fan, while the discharge port 76 is oriented at right angles to the flow of ambient air. According to this arrangement, air flow is induced through the air circulation tube 72 by virtue of the relatively high air pressure at the inlet port 74 as compared with the relatively low air pressure at the discharge port 76. The cooling effect of ambient air circulation through the tube 72 limits the temperature rise within the heat transfer chamber 52, and maintains the operating temperature of the metering tubes in the preferred range of 110° F. to 140° F.

In the foregoing preferred embodiment, the metering tubes 64 are uniformly spaced with respect to each other and extend generally parallel with respect to the flow of the fuel/air mixture 32, and transverse to the circulating flow of the engine coolant 36. The fuel/air mixture is drawn through the jets 66 and into the manifold 14, with the fuel/air mixture being uniformly heated and vaporized as it flows through the jets 66.

In operation, fuel 26 is circulated through the cooling coil assembly 22 to ensure that the fuel will be below ambient temperature as it enters the carburetor 16. Any heat transferred to the fuel in the fuel line due to heat being radiated from the engine will be transferred to the oncoming ambient air flow 34 which is pulled across the radiator 24 by the fan blades 35. Thus, the temperature of the fuel 26 as it enters the carburetor 16 will be below the ambient temperature of the engine compartment. This will ensure that the surface tension of the fuel droplets is relatively high, so that a rich aerosol mixture can be produced, even at very high flow rates of combustion air 28.

By drawing the aerosol fuel/air mixture 32 through the jet openings of the metering tubes 64, the aerosol mixture 32 is divided into a number of flow streams 32A which correspond in number with the jet openings 66. Since the metering tubes 64 are in intimate contact with the engine coolant 36, each one of the metering tubes is at substantially the same temperature as the engine coolant fluid 36, which is circulated through the heat transfer chamber 52. Thus, each one of the separate fuel/air flow streams 32A is heated to substantially the same temperature.

According to the foregoing arrangement, all of the fuel/air aerosol mixture is preheated to the same or substantially the same temperature as it enters the intake manifold 14. Because the heat transfer jets are relatively short, and because they are in axial alignment with the flow path of the fuel/air aerosol mixture 32, the residence time in the vaporizer stage is limited and there is virtually no opportunity for condensation of the aerosol mixture to occur which might cause slugging of fuel condensate into the intake manifold. Thus, the fuel/air mixture is completely vaporized to a dry gas by the time it enters the intake manifold, thereby permitting instantaneous, efficient ignition in the combustion chamber of the engine.

Although the invention has been described with reference to a specific embodiment, this description is not meant to be construed in a limiting sense. Various modifications of the disclosed embodiment as well as alternative embodiments of the invention will become apparant to persons skilled in the art upon reference to the description of the invention. For example, the fuel vaporizer assembly of the invention is shown in combination with an internal combustion engine of the type having a water jacket circulation system from which engine coolant is withdrawn and circulated across the metering tubes. However, it will be appreciated that the fuel vaporizer assembly of the invention can be used in combination with an air cooled internal combustion engine, with the heat transfer fluid being the lubricating engine oil which is forced through the engine block and through the heat exchange chamber by an oil pump. Likewise, a heat transfer fluid other than ambient air may be circulated through the air circulation coil. Therefore, the appended claims will comprehend any such modifications or embodiments that fall within the true scope of the invention.

What is claimed is:

1. A fuel vaporizer assembly for vaporizing the fuel/air aerosol mixture produced by a carburetor for delivery to the intake manifold of an internal combustion engine, said fuel vaporizer assembly comprising a housing having sidewalls enclosing a heat transfer chamber, inlet and outlet fittings for circulating heat transfer fluid through said heat transfer chamber, flow dividing means received within said heat transfer chamber for dividing the fuel/air mixture produced by the carburetor into multiple fluid flow streams for delivery into the intake manifold, and an air circulation tube coiled within said heat transfer chamber, the coiled portion of said air circulation tube being exposed to said heat transfer fluid as it is circulated through the heat exchange chamber, said air circulation tube having a first open end portion adapted to receive ambient air flow and having a second open end portion for venting the ambient cooling air out of the air circulation tube and into the surrounding environment.

2. A fuel vaporizer assembly as defined in claim 1, said flow dividing means comprising a cylindrical metering tube having an outwardly flared inlet lip portion disposed for fluid communication with said carburetor and an outlet portion disposed for fluid communication with said intake manifold.

3. In an internal combustion engine of the type having an intake manifold and a carburetor for producing a fuel/air aerosol mixture for delivery to the intake manifold, the improvement comprising a fuel vaporizer assembly interposed between the carburetor and the intake manifold, said fuel vaporizer assembly including a housing with sidewalls enclosing a heat exchange chamber, inlet and outlet fittings for circulating heat transfer fluid through said heat exchange chamber, and an array of metering tubes disposed within said heat exchange chamber and defining multiple flow passages through said heat exchange chamber, each flow passage communicating on one end with said carburetor and on the opposite end with the intake manifold, and an air circulation tube coiled within the heat exchange chamber, said air circulation tube being disposed for intimate contact with said heat transfer fluid which is circulated through the heat exchange chamber, said air circulation tube having an inlet port for admitting ambient air and an outlet port for venting air out of said air circulation tube and into the surrounding environment.

* * * * *